United States Patent [19]

Heuzé et al.

[11] Patent Number: 4,765,944
[45] Date of Patent: Aug. 23, 1988

[54] DEVICE FOR THE TRANSVERSE RETENTION OF A MOVABLE TUBULAR CONDUIT IN A PRESSURIZED WATER NUCLEAR REACTOR

[75] Inventors: Alain Heuzé, Paris; Claude Cauquelin, Neauphles le Chateau, both of France

[73] Assignee: Framatome, Courbevoie, France

[21] Appl. No.: 10,595

[22] Filed: Feb. 3, 1987

[30] Foreign Application Priority Data

Feb. 3, 1986 [FR] France .............................. 86 01454

[51] Int. Cl.$^4$ ........................ G21C 17/10; G21C 19/20
[52] U.S. Cl. .................................... 376/254; 376/245; 376/292
[58] Field of Search ................ 376/245, 254, 463, 292, 376/287, 288, 352; 138/114, 112, 113; 174/42, 28, 29; 250/519.1, 522.1

[56] References Cited

U.S. PATENT DOCUMENTS

| 2,719,823 | 10/1955 | Zinn | 376/287 |
| 3,136,965 | 6/1964 | Lunden | 138/114 |
| 3,553,350 | 1/1971 | Rawlins | 174/42 |
| 3,626,987 | 12/1971 | Bittner | 138/114 |
| 3,766,005 | 10/1973 | Erkens | 376/245 |
| 4,394,531 | 7/1983 | Delabie | 174/42 |
| 4,410,013 | 10/1983 | Sasaki et al. | 138/114 |
| 4,431,469 | 2/1984 | Falcomato | 138/114 |
| 4,716,004 | 12/1987 | Merkovsky et al. | 376/254 |

FOREIGN PATENT DOCUMENTS

| 3,042,627 | 6/1982 | Fed. Rep. of Germany | 376/292 |
| 0073582 | 8/1960 | France . | |
| 2592517 | 7/1987 | France | 376/245 |
| 2064231 | 6/1981 | United Kingdom | 174/42 |

Primary Examiner—Deborah L. Kyle
Assistant Examiner—Daniel Wasil
Attorney, Agent, or Firm—Pollock, Vande Sande & Priddy

[57] ABSTRACT

In the device, over at least a portion of the length of the internal guide passage (5) of the tubular conduit (15) extends a retaining tube (16) exhibiting radial undulations (17) such that the cylinder having straight generatrices which is inscribed in the tube (16) corresponding to the free passage in a straight line, within this tube, has a diameter less than the diameter of the tubular conduit (15). In the case of a pressurized water nuclear reactor, the retaining tube (16) is preferably placed, at least in part, within the lower core plate (2).

4 Claims, 3 Drawing Sheets

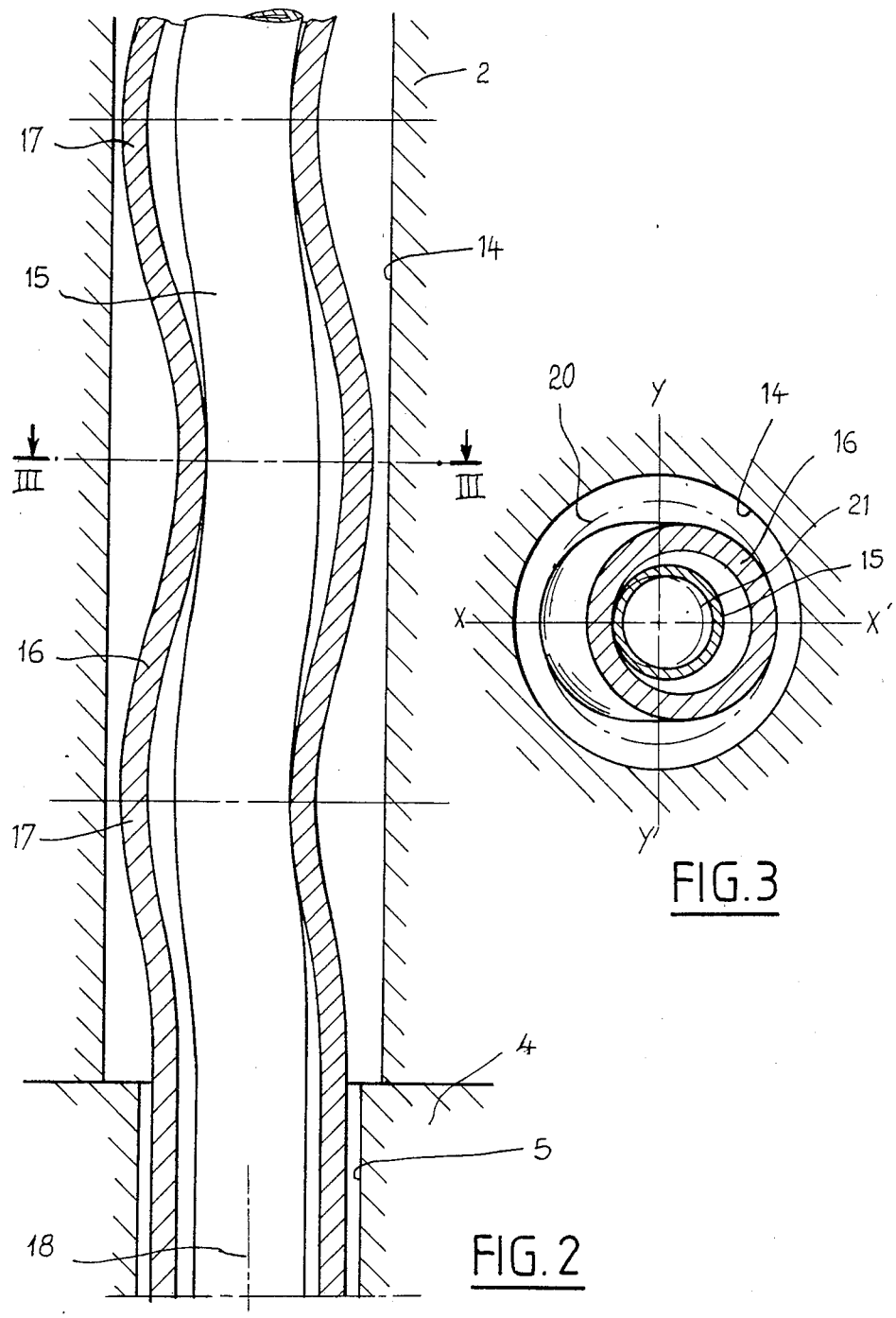

DEVICE FOR THE TRANSVERSE RETENTION OF A MOVABLE TUBULAR CONDUIT IN A PRESSURIZED WATER NUCLEAR REACTOR

FIELD OF THE INVENTION

The invention relates to a device for the transverse retention of a movable tubular conduit, such as a glove finger, of a pressurized water nuclear reactor intended to receive a neutron flux detector for displacement thereof within a guide tube of a fuel assembly.

BACKGROUND OF THE INVENTION

Pressurized water nuclear reactors include a core formed of assemblies which are prismatic in shape and which are disposed vertically and rest on a support plate within the chamber of the nuclear reactor.

During operation of the nuclear reactor, it is necessary to carry out periodically measurements of neutron flux within the actual core. For this purpose, use is made of fission detectors which have very small dimensions and which are displaced by remote control by means of flexible remote control cables, within tubes which are closed at one of their ends and which are called glove fingers. The glove fingers are introduced into certain fuel assemblies which are disposed in accordance with a predetermined distribution within the core. By displacing the flux detectors within the glove fingers introduced into the fuel assemblies, it is possible to carry out flux measurements over the entire height of the core. It must be possible for the glove fingers to be extracted from the assemblies of the core, for example in order to facilitate the operations of recharging the core of the reactor; in order to do this, traction is exerted on the end of the glove fingers, from an instrumentation which is disposed laterally relative to the chamber bore of the reactor.

The glove fingers must accordingly be guided from the instrumentation centre as far as the chamber, and then into the interior of the chamber, between the lower domed floor of this chamber and the entry end of the guide tubes of the corresponding assemblies. In order to do this, each one of the glove fingers is introduced into internal cylindrical and rectilinear passage of a guide assembly which includes, in particular, a guide tube passing into a connecting collar of the floor of the chamber, a guide column and an opening traversing the lower core plate in the extension of the guide tube of the assembly.

This cylindrical connecting passage of the glove finger has a diameter which generally decreases from the chamber floor to the fuel assembly, this diameter nevertheless remaining substantially greater than the external diameter of the glove finger, in order to permit facilitated introduction and displacement of this glove finger in the connecting passage.

The terminal part of the guide assembly is generally constituted by a sleeve fixed on the upper face of the core plate in the extension of the opening passing through this plate. A space is nevertheless provided between the end of this sleeve and the inlet of the guide tube of the fuel assembly, in order to facilitate the setting-up of this assembly on the occasion of the recharging of the reactor, and to permit the displacements accompanying the differential expansion of the fuel assembly relative to the lower internal equipment of the reactor.

The pressurized cooling water of the reactor, which water circulates at high speed in the chamber, causes the initiation of vibration of the glove fingers and impacts by these glove fingers against the walls of the internal passage of the guide assembly in which the glove finger is mounted with a certain play.

The pressurized water circulating in transverse directions acts on the glove finger, in the zone where the latter is not protected by a guide means, prior to entry thereof into the guide tube of the assembly. The pressurized water likewise passes through the internal cylindrical passage of the guide assembly in its axial direction, and this turbulent flow likewise generates vibrations and impacts by the glove finger against the walls of the connecting passage.

This results in excessive wear and possibly deteriorations of the glove fingers when the reactor is in service.

SUMMARY OF THE INVENTION

The object of the invention is accordingly to provide a device for the transverse retention of a tubular conduit movable in the axial direction of a rectilinear cylindrical internal passage of a diameter substantially greater than the diameter of the conduit, provided in a guide assembly of the conduit, this device, which is usable in particular for the transverse retention of a glove finger in a pressurized water nuclear reactor, permitting avoidance of the vibrations and the impacts of the tubular conduit in its guide passage, while maintaining the possibility of introducing and of displacing this tubular conduit easily in the passage and while maintaining a free section between the conduit and the internal surface of the passage of a substantially constant extent following the length of the passage.

In order to achieve this object, the retaining device includes, over at least a part of the length of the internal passage of the guide assembly, a retaining tube, the cross-section of which through a plane perpendicular to the axis of the cylindrical passage is substantially circular and which has an internal diameter greater than the external diameter of the conduit, this retaining tube exhibiting deformations in radial directions, which are regularly distributed over the length thereof, in such a manner that the cylinder having straight generatrices which is coaxial with the cylindrical passage and which is inscribed in the remaining tube has a diameter less than the external diameter of the conduit, and that the cylinder having straight generatrices which is coaxial with the cylindrical passage and circumscribed at the retaining tube has a diameter less than the minimum diameter of the cylindrical passage.

BRIEF DESCRIPTION OF THE DRAWINGS

In order to provide a proper understanding of the invention, a description will now be given, by way of example, with reference to the drawings attached hereto, of one embodiment of a retaining device according to the invention, in the case where the tubular conduit is a glove finger in which a neutron flux sensor is displaced, in a pressurized water nuclear reactor.

FIG. 2 is a view, in section through a vertical plane, of a part of the internal passage of the guide assembly of a glove finger, in which assembly a retaining tube according to the invention is disposed;

FIG. 3 is a sectional view along III—III of FIG. 2;

DETAILED DESCRIPTION

Figure 1:
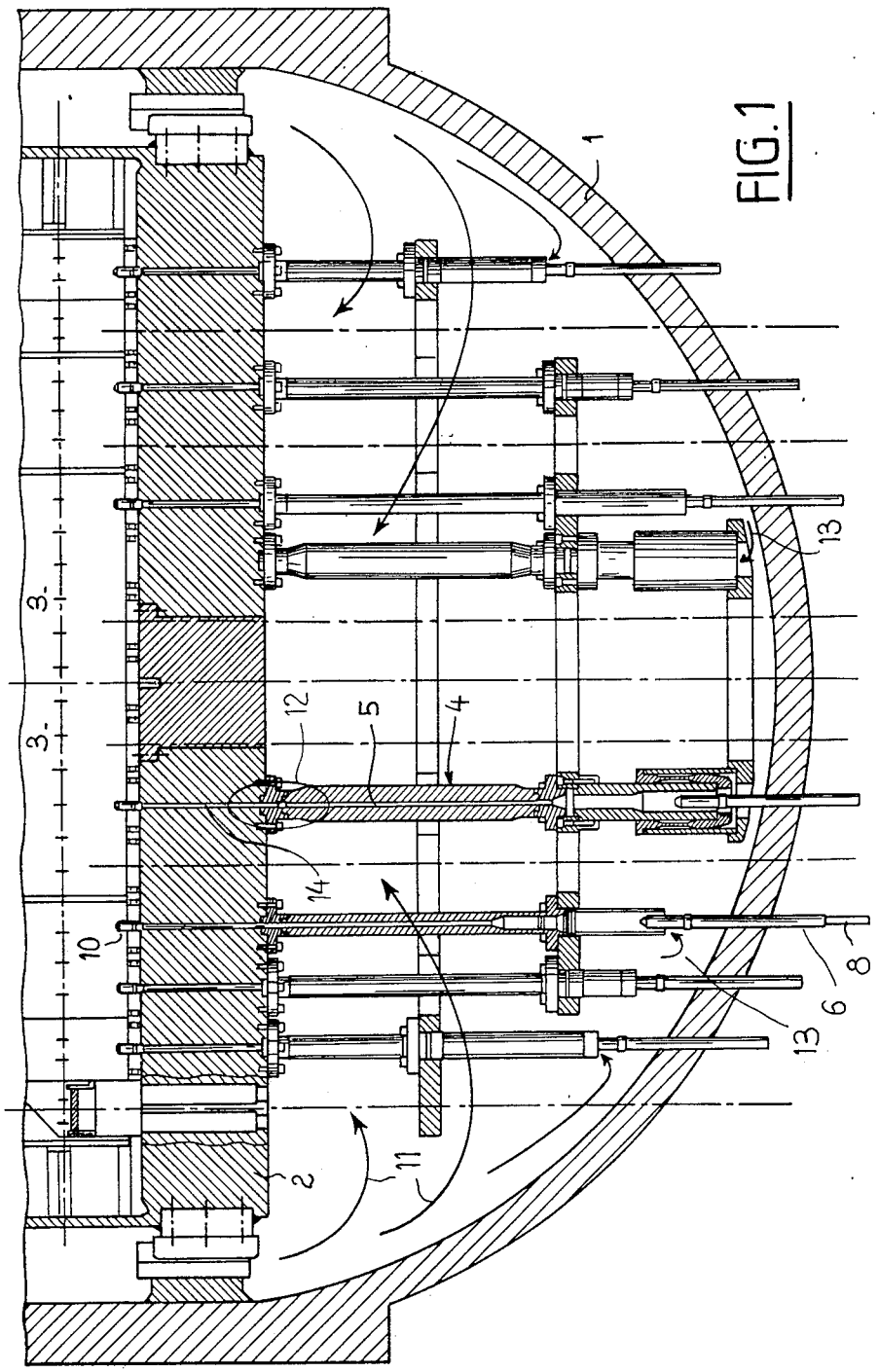
FIG. 1 is a view, in section through a vertical plane, of the lower part of the chamber of a pressurized water nuclear reactor including several glove finger guide assemblies.

FIG. 1 shows the domed chamber floor 1 of a pressurized water nuclear reactor, as well as the lower core plate 2, on which rest the fuel assemblies 3 constituting the core of the reactor. Between the floor 1 and the plate 2 there are disposed guide assemblies 4 including a cylindrical and rectilinear internal passage 5, having a diameter greater than the external diameter of the glove finger 15. These assemblies 4 include, in particular, collars 6 passing through the domed floor 1 of the chamber and extending into the upper part of the guide assembly fixed on the lower face of the core plate 2 and constituted by a guide column. The glove fingers are introduced into a guide tube 8 fixed within the collar 6 at one of its ends and extending into the instrumentation center adjacent to the chamber bore of the reactor at its other end. The glove fingers thus extend into the connecting passages 5 of the guide assembly, the diameter of which decreases between the orifice for the introduction of the collar 6 and a sleeve 10 fixed on the plate 2 in the extension of an opening 14 passing through the core plate 2 over its entire thickness. This internal passage 5 constituted by successive cylindrical and rectilinear coaxial parts has a diameter which is substantially greater than the external diameter of the glove finger, even in its smallest diameter portion.

The pressurized water circulating in the lower part of the chamber of the reactor, for example in the direction of the arrows 11, may penetrate into the internal guide passage 5, as is illustrated by the arrows 13, and circulate in this internal passage 5 in the axial direction. This highly disturbed flow of pressurized water has a turbulent configuration and may give rise to the initiation of vibration of the glove finger in the passage 5 and generate impacts of the glove finger against the internal wall of the passage 5. Likewise, the circulation of pressurized water in transverse directions relative to the axis of the passage 5, in zones where the glove finger is not protected, may give rise to the same phenomena, generating wear or deteriorations of the tube.

A description will now be given, with reference to FIGS. 2 and 3, of the device for transverse retention of the glove finger according to the invention. FIG. 2 represents an enlarged view of the detail 12 of FIG. 1, i.e., the internal passage of the guide assembly, at the level of the opening 14 in the core plate 2 and of the upper part of the connecting passage of the column 4. In this zone, the glove finger 15 constituting a tubular guide conduit of a neutron flux detector closed at its upper part (not shown) is introduced into the interior of a retaining tube 16, the circular section of which is shown in FIG. 3. The internal diameter of this tube 16 is substantially greater than the external diameter of the glove finger 15, while the external diameter of this tube 16 is substantially less than the diameter of the rectilinear cylindrical passage 5, both in its part 14 passing through the plate 2 and in its part passing through the column 4.

As can be seen in FIG. 2, the retaining tube 16 exhibits successive undulations 17 which are disposed in a regularly spaced manner in the direction of the axis 18 of the passage 5.

These undulations may be obtained by alternate folds of a straight tube with an axis of folding of constant direction, in the present case the direction perpendicular to the plane of FIG. 2. This results in radial deformations of the tube in a single direction corresponding to the axis XX' of FIG. 3, the tube not undergoing deformation in the radial direction YY'.

It is seen that the retaining tube 16 which is obtained is such that it can be circumscribed in a cylinder which has a straight generatrix and which has as its axis the axis 18 of the passage 5, the circular section 20 of which is visible in FIG. 3. A cylinder having a straight generatrix of axis 18 may also be inscribed within the tube 16; the circular section 21 of this inscribed cylinder is shown in FIG. 3.

According to the invention, the cylinder circumscribed at the retaining tube 16 has a diameter substantially less than the internal diameter of the passage 5. Likewise, the inscribed cylinder 21 has a diameter substantially less than the external diameter of the glove finger 15. When the glove finger is introduced into the internal passage 5 of the guide assembly, and when this glove finger 15 penetrates into the retaining tube 16, it must be deformed according to a shape similar to the shape of the tube 16, in order to pass into the internal space of this retaining tube, since the free passage in a straight line in this tube has a diameter less than the external diameter of the glove finger.

As can be seen in FIG. 2, the tube 16 and the glove finger 15 then have their generatrices in sinusoidal form, and are in mutual support at points which are regularly spaced in the axial direction 18 of the passage 5.

The progression of the glove finger 15 within the tube 16 is followed by alternate deformations of the glove finger until the time when this glove finger has penetrated into the fuel assembly as far as its upper part, through the instrumentation guide tube of this assembly. The part of the glove finger 15 situated in the retaining tube 16 is then deformed in an alternating manner, as shown in FIG. 2. The glove finger is then transversely retained by the wall of the retaining tube 16, which has a certain rigidity. On the other hand, the location of the glove finger 15 within the tube 16 is facilitated by the fact that the tube 16 is not supported against the walls of the passage 5, and may thus be easily deformed in the radial direction in order to release the glove finger. During operation of the nuclear reactor, the pressurized water exerts radial forces on the glove finger 15; these radial forces do not permit the displacement of the glove finger, which is transversely supported against the retaining tube 16.

Furthermore, the passage cross-section of the pressurized water between the glove finger 15 and the internal surface of the tube 16 is virtually constant over the entire guide length, by virtue of the alternating form of the radial deformations of the tube 16.

Figure 4:
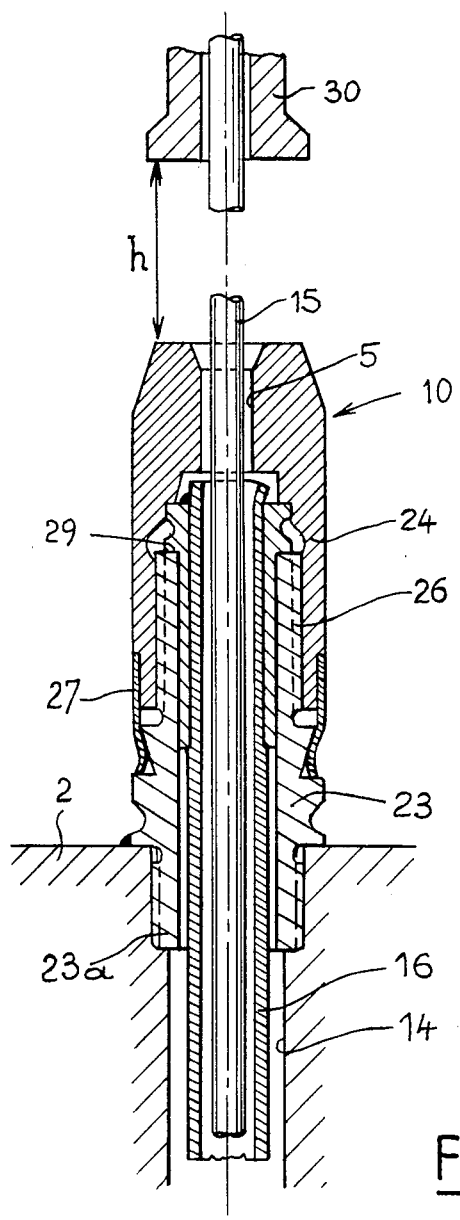
FIG. 4 is a view, in section through a vertical plane, of the upper part of a guide passage of a glove finger provided with a retaining tube according to the invention.

FIG. 4 shows the upper part of the guide assembly including a sleeve 10 formed of two parts 23 and 24. The part 23 includes a threaded connecting piece 23a which is fixed in a tapped hole provided in the core plate 2 at the exit of the opening 14 passing through this plate. A weld seam 25 permits permanent fixing of the part 23 of the sleeve on the plate 2.

The part 24 of the sleeve includes an internal screw thread 26 intended to ensure the fixing, by screwing, of the part 24 on the threaded end of the part 23. Blades 27, which are fixed at their ends on the part 24, are pressed into notches of the part 23; they permit the prevention of the releasing of the assembly between these parts 23 and 24 of the sleeve, and also permit possible demounting.

The end of the retaining tube 16 is fixed within the sleeve 10 by means of a fixing sleeve 29 having an upper neck which is supported on the end of the part 23 of the sleeve. The retaining tube 16 includes an end portion which is straight, i.e., which does not exhibit undulations, which is introduced into the interior of the sleeve 29 and fixed on the latter.

The terminal part of the guide passage 5 of the glove finger 15 is constituted by the central bore of the part 24 of the sleeve 10. The end 30 of the guide tube of the assembly into which the glove finger is introduced is situated above the sleeve 10, with a certain spacing of height h.

It is seen that, when it is introduced into the guide tube 30, the glove finger 15 retained by the tube 16 in the lower part of the sleeve 10 and within the opening 14 of the core plate 2 does not undergo transverse displacements, for example under the influence of the current of pressurized water coming into contact with the glove finger between the sleeve 10 and the end of the guide tube 30.

The transverse retaining device according to the invention thus has the advantage of being of high efficiency in spite of a very high degree of simplicity of design and of fitting in the guide passage of the reactor. On the other hand, the retaining device exhibits the advantage of including only a single component fixed rigidly on the internal equipment of the reactor. This results in the avoidance of any deterioration which might arise in the case of a device including movable elements.

It is possible to contemplate forms of the retaining tube other than the "plane undulations" form which has been described. The tube may, for example, have a continuous and helical undulation, in such a manner that the glove finger is supported in this tube in a continuous helical zone or in successive zones in the form of portions of the helix. The retaining tube may likewise be provided with axially alternating discontinuous indentations which reduce the free internal cross-section of passage in a straight line, so as to reach a value less than the external section of the glove finger.

The retaining tube may be constructed of any appropriate material, for example of stainless steel or nickel alloy, in the case where it serves for the retention of a glove finger within the chamber of a pressurized water nuclear reactor.

The fixing of the retaining tube in the internal passage of the guide assembly may be undertaken in a manner different from that which has been described, and the retaining tube constructed in the form of a continuous tube or of successive tube portions may be disposed in any part of the internal passage of the guide assembly; the aim will be to dispose this retaining tube in the zone or zones of the internal guide passage in which the glove finger or other tubular conduit is most affected by external constraints.

Finally, the transverse retaining device according to the invention is applicable to tubular conduits different from glove fingers of a pressurized water nuclear reactor.

What is claimed is:

1. In a pressurized water nuclear reactor comprising a vessel having a rounded bottom head comprising through-passages for measuring devices, a core held in said vessel composed of fuel assemblies each comprising a guide tube and resting on a lower core plate fixed in said vessel above said bottom head and guiding devices disposed inside said vessel between said bottom head and said lower core plate, each of said guiding devices defining with a corresponding passage in said bottom head and a corresponding passage through said lower core plate a rectilinear, cylindrical internal passage aligned with a guide tube of an assembly for receiving an axially displaceable neutron measuring device in the form of a tubular conduit, called glove finger, the diameter of said glove finger being substantially smaller than the diameter of said internal passage, the improvement consisting of device for the transverse retention of said glove finger disposed within said internal passage and comprising, over at least part of the length of said internal passage, a retaining tube having a substantially constant thickness and exhibiting radial deformations regularly distributed over the length thereof in such a manner that the inner surface of said tube defines a cylindrical free passage having straight generatrices, coaxial with said internal passage and inscribed in said inner surface along the entire length of said tube, the diameter of which is smaller than the external diameter of said glove finger, there being a cylindrical surface having straight generatrices, coaxial with said internal passage and circumscribed around said retaining tube along the entire length thereof, the diameter of said tube being smaller than the minimum diameter of said internal passage.

2. Transverse retaining device according to claim 1, wherein the retaining tube exhibits successive undulations along the length thereof, which are directed in a single radial direction, in such a manner that the corresponding generatrices of the retaining tube have a substantially sinusoidal shape.

3. Transverse retaining device according to claim 1, wherein the retaining tube exhibits a radial deformation arrangement disposed to follow at least one helix having an axis substantially coincident with the axis of the cylindrical free passage.

4. Transverse retaining device according to claim 1, wherein said retaining tube is fixed in a demountable manner in a sleeve fixed on said lower core plate, in a position adjacent to an entry end of a guide tube of an assembly.

* * * * *